US010196992B2

(12) United States Patent
Imaizumi et al.

(10) Patent No.: US 10,196,992 B2
(45) Date of Patent: Feb. 5, 2019

(54) ENGINE CONTROL DEVICE

(71) Applicant: FUJI JUKOGYO KABUSHIKI KAISHA, Tokyo (JP)

(72) Inventors: Yusuke Imaizumi, Tokyo (JP); Makoto Ito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 155 days.

(21) Appl. No.: 15/440,392

(22) Filed: Feb. 23, 2017

(65) Prior Publication Data

US 2017/0276078 A1     Sep. 28, 2017

(30) Foreign Application Priority Data

Mar. 24, 2016 (JP) .................. 2016-060018

(51) Int. Cl.
*F02B 33/44*     (2006.01)
*F02D 41/00*     (2006.01)
(Continued)

(52) U.S. Cl.
CPC .......... *F02D 41/0032* (2013.01); *F02B 37/16* (2013.01); *F02D 41/0007* (2013.01);
(Continued)

(58) Field of Classification Search
CPC .... F02B 37/16; F02B 37/127; F02D 41/0032; F02M 25/0809; F02M 25/0836
(Continued)

(56) References Cited

U.S. PATENT DOCUMENTS

| 5,005,550 A | * | 4/1991 | Bugin, Jr. | ............ | F02M 25/089 |
| | | | | | 123/520 |
| 2014/0318514 A1 | * | 10/2014 | Pursifull | .............. | F01M 13/022 |
| | | | | | 123/568.29 |

(Continued)

FOREIGN PATENT DOCUMENTS

| JP | 62-078430 | 4/1987 |
| JP | 08-014117 | 1/1996 |

(Continued)

OTHER PUBLICATIONS

Japanese Office Action dated Aug. 1, 2017, in Japanese Patent Application No. 2016-060018 (8 pages—Japanese with English translation).

*Primary Examiner* — Ngoc T Nguyen
(74) *Attorney, Agent, or Firm* — Smith, Gambrell & Russell, LLP

(57) ABSTRACT

An engine control device configured to control an engine includes: a turbocharger having a turbine that is configured to be driven by exhaust gas of the engine; and a compressor coupled to the turbine and configured to compress fresh air; an air-bypass passage that communicates between an upstream and a downstream of the compressor; an air-bypass valve configured to open/close the passage; a canister configured to store evaporated fuel gas generated in a fuel tank; an ejector configured to suction the evaporated fuel gas from the canister by using differential pressure between the upstream and the downstream of the compressor and introduce the evaporated fuel gas to the upstream; a purge valve configured to open/close a purge passage through which the evaporated fuel gas is to delivered from the canister to the ejector; and a purge valve diagnosis unit configured to detect stuck open malfunction of the purge valve.

6 Claims, 2 Drawing Sheets

(51) Int. Cl.
*F02B 37/16* (2006.01)
*F02M 25/08* (2006.01)
F02D 41/14 (2006.01)
F02D 41/22 (2006.01)

(52) U.S. Cl.
CPC ...... F02M 25/0809 (2013.01); F02M 25/089 (2013.01); F02M 25/0836 (2013.01); F02D 41/0042 (2013.01); F02D 41/1454 (2013.01); F02D 2041/227 (2013.01)

(58) Field of Classification Search
USPC .......................................................... 60/611
See application file for complete search history.

(56) References Cited

U.S. PATENT DOCUMENTS

| | | |
|---|---|---|
| 2015/0292421 A1 | 10/2015 | Pursifull et al. |
| 2016/0305352 A1* | 10/2016 | Pursifull .............. F02M 35/104 |
| 2016/0377031 A1* | 12/2016 | Pursifull ............ F02M 25/0836 60/602 |
| 2017/0002761 A1* | 1/2017 | Dudar ..................... F02D 41/22 |
| 2018/0163659 A1* | 6/2018 | Dudar .................. F02D 41/221 |

FOREIGN PATENT DOCUMENTS

| | | |
|---|---|---|
| JP | 08-326611 | 12/1996 |
| JP | 2002-250248 A | 9/2002 |
| JP | 2007-113517 A | 5/2007 |
| JP | 2013-174143 | 9/2013 |

* cited by examiner

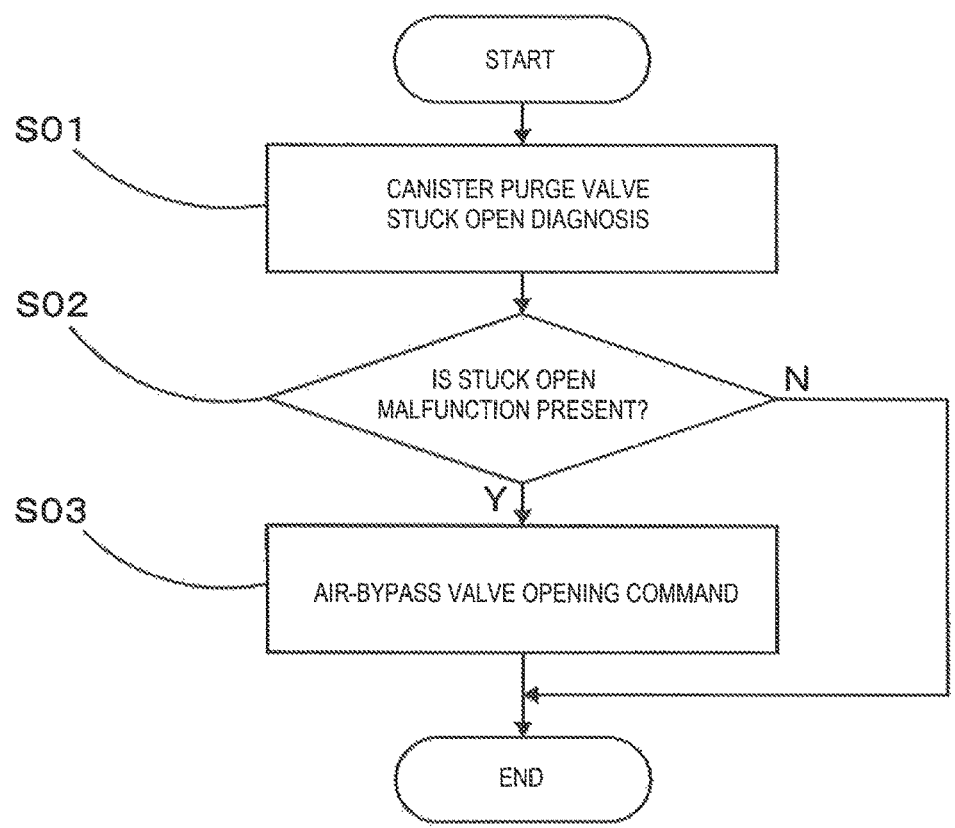

ENGINE CONTROL DEVICE

CROSS-REFERENCE TO RELATED APPLICATIONS

The present application claims priority from Japanese Patent Application. No. 2016-060018 filed on Mar. 24, 2016, the entire contents of which are hereby incorporated by reference.

BACKGROUND

1. Technical Field

The present invention relates to an engine control device that controls a turbocharged engine and auxiliaries thereof, and in particular to an engine control device capable of suppressing a flow rate of purge gas even when a purge valve provided in a pipe line is stuck open, the pipe line suctioning the purge gas from a canister by an ejector.

2. Related Art

An evaporated fuel processing device is provided in an automobile on which a gasoline engine is mounted, and prevents discharge of evaporated fuel gas (fuel vapor) generated in a fuel tank to outside.

In the evaporated fuel processing device, activated charcoal in a canister adsorbs and temporarily stores the evaporated fuel gas. When an engine is driven, the evaporated fuel gas is introduced from the canister into an intake system and is subjected to combustion processing in a combustion chamber. In this way, the evaporated fuel gas is purged from the canister.

In general, the evaporated fuel gas (purge gas) is introduced from the canister into the intake system by using negative pressure of an intake pipe when the engine is driven.

As related art on the evaporated fuel processing device, for instance, Japanese Unexamined Patent Application Publication (JP-A) No. 2013-174143 describes that, in order to allow canister purge in a turbocharged engine during turbocharging, an ejector as a type of a negative pressure generator is provided in a passage that bypasses an upstream side and a downstream side of a compressor, and suctions the purge gas.

As related art on such a bypass passage, it is described in Japanese Unexamined Patent Application Publication (JP-A) No. 62-78430 that an air-bypass valve is provided in the passage that bypasses the upstream side and the downstream side of the compressor, and can open/close the passage.

In addition, as related art on diagnosis, fail-safe, and the like during malfunction of a purge valve, it is described in Japanese Unexamined Patent Application Publication (JP-A) No. 8-14117 that purge valve open malfunction is determined on the basis of output of an air-fuel ratio sensor that is output after a close operation signal is output in an opened state of the purge valve and that a drain cut valve and a tank pressure valve are closed in accordance with a positive determination.

It is described in Japanese Unexamined Patent Application Publication (JP-A) No. 8-326611 that a ventilation blocking valve is provided in a ventilation pipe that communicates between the canister and ambient air and that the ventilation blocking valve is closed when open malfunction of a purge control valve is detected.

The ejector that suctions the purge gas by using differential pressure between an input side and an output side of the compressor of a turbocharger is provided. In this way, the canister purge can be performed in a supercharging region where the negative pressure of the intake pipe is not generated.

In a so-called downsized turbo engine with a relatively high use frequency of the supercharging region, such an ejector is effective in securing a sufficient canister purge ability.

However, when stuck open malfunction occurs to the purge valve in the engine having such an ejector, a flow rate of the purge gas can no longer be controlled, and an excess amount of the purge gas is introduced into the intake pipe line. Consequently, an air-fuel ratio becomes excessively rich, which possibly leads to degraded drivability (ease of driving) and an engine stall due to rich misfire.

SUMMARY OF THE INVENTION

It is desirable to provide an engine control device that can suppress a flow rate of purge gas even when a purge valve that is provided in a pipe line is stuck open, the pipe line suctioning the purge gas from a canister by an ejector.

A first aspect of the present invention provides an engine control device configured to control an engine. The engine control device includes: a turbocharger that has: a turbine that is configured to be driven by exhaust gas of the engine; and a compressor that is coupled to the turbine and configured to compress fresh air; an air-bypass passage that communicates between an upstream and a downstream of the compressor; an air-bypass valve configured to open/close the air-bypass passage; a canister configured to store evaporated fuel gas generated in a fuel tank; an ejector configured to suction the evaporated fuel gas from the canister by using differential pressure between the upstream and the downstream of the compressor and to introduce the evaporated fuel gas to the upstream of the compressor; a purge valve configured to open/close a purge passage through which the evaporated fuel gas is to be delivered from the canister to the ejector; and a purge valve diagnosis unit configured to detect stuck open malfunction of the purge valve. When the purge valve diagnosis unit detects the stuck open malfunction, the engine control device executes purge suppression control so that an opening degree of the air-bypass valve becomes at least equal to a predetermined opening degree.

The opening degree of the air-bypass valve during the execution of the purge suppression control may be set such that an air-fuel ratio of the engine is leaner than a rich misfire occurring region.

The opening degree of the air-bypass valve may be subjected to feedback control during the execution of the purge suppression control such that an air-fuel ratio of the engine is out of a rich misfire occurring region.

The purge passage may include a branched pipe section for introducing some of the evaporated fuel gas into an intake pipe line on the downstream of the compressor, and the opening degree of the air-bypass valve may be set such that pressure in the intake pipe line on the downstream of the compressor becomes equal to or higher than pressure in the purge passage during the execution of the purge suppression control.

BRIEF DESCRIPTION OF THE DRAWINGS

FIG. 2 is a flowchart that illustrates air-bypass valve control during malfunction of a purge valve in the engine of the first example.

DETAILED DESCRIPTION

Figure 1:
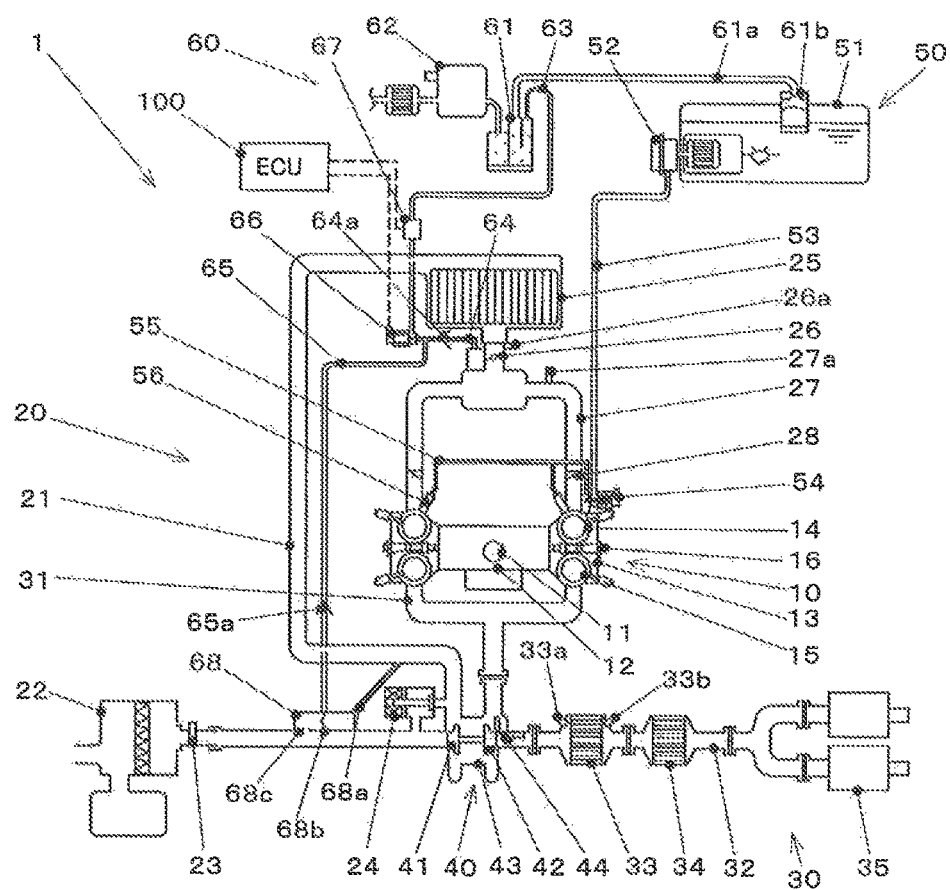
FIG. 1 schematically illustrates a configuration of an engine having a first example of an engine control device, to which the present invention is applied.

The present invention has a purpose of providing an engine control device capable of suppressing a flow rate of purge gas even when a purge valve that is provided in a pipe line is stuck open, the pipe line suctioning the purge gas from a canister by an ejector. Such a purpose is realized by opening an air-bypass valve when stuck open malfunction of the purge valve is detected, and the air-bypass valve makes fresh air bypass a passage between an upstream and a downstream of a compressor.

FIRST EXAMPLE

A description will hereinafter be made on a first example of an engine control device, to which the present invention is applied.

The engine control device of the first example is provided in a turbocharged gasoline engine that is mounted as a traveling power source in an automobile such as a passenger car.

FIG. 1 schematically illustrates a configuration of an engine having the engine control device of the first example.

As illustrated in FIG. 1, an engine 1 has a main body 10, an intake system 20, an exhaust system 30, a turbocharger 40, a fuel supply device 50, an evaporated fuel processing device 60, an engine control unit (ECU) 100, and the like.

The main body 10 is a main engine part of the engine 1 and is a horizontally-opposed four-cylinder four-stroke DOHC gasoline direct injection engine, for instance.

The main body 10 has a crankshaft 11, a cylinder block 12, a cylinder head 13, an intake valve drive system 14, an exhaust valve drive system 15, an ignition plug 16, and the like.

The crankshaft 11 is an output shaft of the engine 1 and is coupled to an unillustrated piston of each cylinder via a connecting rod (a conrod).

The cylinder block 12 is a block-shaped member that has the cylinders, and is divided into two of right and left parts with the crankshaft 11 being interposed therebetween.

In a right half of the cylinder block 12 (right and left described herein respectively indicate right and left of a vehicle body in an in-vehicle state where the cylinder block 12 is vertically disposed), first and third cylinders are sequentially provided from a vehicle front side. In a left half thereof, second and fourth cylinders are provided.

A crankcase that accommodates the crankshaft 11 is provided in a joined section between the right and left halves of the cylinder block 12.

The crankshaft 11 is rotatably supported by a main bearing that is provided in the cylinder block 12.

The cylinder block 12 is provided with an unillustrated crank angle sensor that detects an angle position of the crankshaft 11.

The cylinder head 13 is provided at each of right and left ends of the cylinder block 12.

The cylinder head 13 has a combustion chamber, an intake port, an exhaust port, an intake valve, an exhaust valve, and the like.

The combustion chamber is a recessed section that is provided in a manner to face a crown surface of the unillustrated piston, and constitutes a part of a space in which air-fuel mixture that is compressed by the piston is combusted.

The intake port is a passage through which combustion air (fresh air) is introduced into the combustion chamber.

The exhaust port is a passage through which burnt gas (exhaust gas) is discharged from the combustion chamber.

The intake valve and the exhaust valve respectively open/close the intake port and the exhaust port at predetermined valve timing.

Each of the intake valve drive system 14 and the exhaust valve drive system 15 has: a cam sprocket that is driven by a crankshaft sprocket provided at an end of the crankshaft 11 via an unillustrated timing chain, for instance; a camshaft that is driven by the cam sprocket; and the like.

In addition, each of the intake valve drive system 14 and the exhaust valve drive system 15 includes a variable valve timing mechanism that causes relative rotation of the cam sprocket and the camshaft about a rotation center shaft by using a hydraulic actuator.

The ignition plug 16 produces an electric spark in the combustion chamber in accordance with an ignition signal from the ECU 100, so as to ignite the air-fuel mixture.

The intake system 20 suctions the ambient air and introduces the ambient air as the combustion air into the intake port in the cylinder head 13.

The intake system 20 has an intake duct 21, an air cleaner 22, an airflow meter 23, an air-bypass valve 24, an intercooler 25, a throttle 26, an intake manifold 27, a tumble control valve 28, and the like.

The intake duct 21 is a pipe line through which the combustion air suctioned from the outside is delivered.

As will be described below, a compressor 41 of the turbocharger 40 is provided in an intermediate cart of the intake duct 21.

The air cleaner 22 is provided near an entry of the intake duct 21 and includes: an air cleaner element that filters the air for foreign substances such as dust; an air cleaner case that accommodates the air cleaner element; and the like.

The airflow meter 23 is a sensor that is provided at an exit of the air cleaner 22 measures a flow rate of the air flowing therethrough.

Output of the airflow meter 23 is transmitted to the ECU 100 and is used for control of a fuel injection amount and the like.

The air-bypass valve 24 opens/closes, a bypass passage that makes some of the air flowing through the intake duct 21 bypass a part of the intake duct 21 between an upstream and a downstream of the compressor 41.

An opening degree of the air-bypass valve 24 (the flow rate of the bypassing air) can be changed in accordance with a command from the ECU 100. The air-bypass valve 24 may be a valve whose opening degree is switched between full opening and full closing, or may be a valve whose opening degree can be controlled at any opening degree between full opening and full closing, for instance.

When the air-bypass valve 24 is opened during turbocharging, some of the turbocharged fresh air on the downstream of the compressor 41 in the intake duct 21 is circulated to the upstream of the compressor 41.

In this way, differential pressure between the upstream and the downstream of the compressor 41 can be reduced.

The air-bypass valve 24 is opened to protect a blade of a turbine 42 during deceleration, to suppress a flow rate of purge gas during stuck open malfunction of a purge valve 66, and the like, for instance, and is closed in a normal time.

The intercooler 25 cools the air that has been compressed by the compressor 41 through heat exchange with travel wind (an airstream generated on the vehicle body by a travel of the vehicle).

The throttle 26 includes a throttle valve that adjusts an intake air amount, so as to adjust output of the engine 1.

The throttle valve is driven by an electric actuator in accordance with a command from the ECU 100, so as to be opened/closed at a predetermined opening degree.

The throttle 26 is disposed next to an exit of the intercooler 25.

A pressure sensor 26a that detects pressure of an intake pipe is provided on an entry (an upstream) of the throttle 26.

Output of the pressure sensor 26a is transmitted to the ECU 100.

The intake manifold 27 is a branched pipe that distributes the air discharged from the throttle 26 to the intake port of each of the cylinders.

The intake manifold 27 is provided with a pressure sensor 27a that detects the pressure of the intake pipe on a downstream of the throttle 26.

Output of the pressure sensor 27a is transmitted to the ECU 100.

The tumble control valve 28 is provided in a passage of the intake manifold 27, switches a state of an air passage from the intake manifold 27 to the intake port, and thereby controls a state of a tumble flow that is generated in the cylinder.

The tumble control valve 28 is switched in accordance with a command from the ECU 100.

The exhaust system 30 discharges the burnt gas (the exhaust gas) from the exhaust port of the cylinder head 13.

The exhaust system 30 has an exhaust manifold 31, an exhaust pipe 32, a front catalyst 33, a rear catalyst 34, a silencer 35, and the like.

The exhaust manifold 31 is an exhaust gas passage (pipe line) that collects the exhaust gas discharged from the exhaust port of each of the cylinders and introduces the exhaust gas into the turbine 42 of the turbocharger 40.

The exhaust pipe 32 is an exhaust gas passage (pipe line) that is used to discharge the exhaust gas discharged from the turbine 42 of the turbocharger 40 to the outside.

The front catalyst 33 and the rear catalyst 34 are sequentially provided from the turbine 42 side in an intermediate part of the exhaust manifold 31.

Each of the front catalyst 33 and the rear catalyst 34 is a three-way catalyst in which a carrier, for instance, alumina carries a precious metal, such as platinum, rhodium, or palladium, to perform reduction processing of EC, CO, and NOx.

A front A/F sensor 33a and a rear A/F sensor 33b are respectively provided at an entry and an exit of the front catalyst 33 and each detect the air-fuel ratio (A/F) based on a property of the exhaust gas.

Output of the front A/F sensor 33a and output of the rear A/F sensor 33b are transmitted to the ECU 100 and are used for air-fuel ratio feedback control of the fuel injection amount, deterioration diagnosis of the front catalyst 33, and the like.

The silencer 35 is disposed next to an exit of the exhaust pipe 32, reduces sound energy of the exhaust gas, and thereby suppresses exhaust noise.

The exhaust pipe 32 is branched into two pipes near the exit, for instance, and the silencer 35 is provided in each downstream part of a branched position.

The turbocharger 40 is an exhaust gas turbine supercharger that compresses the fresh air by using energy of the exhaust gas.

The turbocharger 40 has the compressor 41, the turbine 42, a bearing housing 43, a waste gate valve 44, and the like.

The compressor 41 is a centrifugal compressor that compresses the combustion air.

The turbine 42 drives the compressor 41 by using the energy of the exhaust gas.

The bearing housing 43 is provided between the compressor 41 and the turbine 42.

The bearing housing 43 couples between housings of the compressor 41 and the turbine 42 and has: a bearing that rotatably supports a shaft coupling a compressor wheel and a turbine wheel; a lubricating device; and the like.

The waste gate valve 44 opens closes a waste gate passage that makes some of the exhaust gas bypass a part from an entry side to an exit side of the turbine 42.

The waste gate valve 44 has: an electric actuator that drives the waste gate valve 44 for opening/closing; and, an unillustrated opening degree sensor that detects an opening degree position, and an opening degree thereof is controlled by the ECU 100.

The fuel supply device 50 supplies fuel to each of the cylinders of the engine 1.

The fuel supply device 50 includes a fuel tank 51, a feed pump 52, a feed line 53, a high-pressure pump 54, a high-pressure fuel line 55, an injector 56, and the like.

The fuel tank 51 is a container that stores gasoline as the fuel.

The feed pump 52 discharges the fuel in the fuel tank. 51 and delivers the fuel to the high-pressure pump 54.

The feed line 53 is a fuel, passage through which the fuel discharged by the feed pump 52 is delivered to the high-pressure pump 54.

The high-pressure pump 54 is attached to the cylinder head 13, is driven via the camshaft, and thereby boosts fuel pressure.

The high-pressure pump 54 includes: a plunger that reciprocates in the cylinder in an interlocking manner with rotation of the camshaft, so as to pressurize the fuel; and an electromagnetic metering valve, controls a duty ratio of the electromagnetic metering valve by the ECU 100, and can thereby adjust the fuel pressure in the high-pressure fuel line 55.

The high-pressure fuel line 55 is a fuel passage through which the boosted fuel by the high-pressure pump 54 is delivered to the injector 56 that is provided in each of the cylinders.

The injector 56 is an injection valve that enables cylinder injection (direct injection) of the fuel supplied from the high-pressure fuel line 55 into the combustion chamber of each of the cylinders in accordance with an injection signal from the ECU 100.

The evaporated fuel processing device 60 temporarily stores evaporated fuel gas (fuel vapor) in a canister 61, introduces the evaporated fuel gas as purge gas into the intake duct 21 (canister purge) during driving of the engine 1, and thereby performs combustion processing in the combustion chamber. The evaporated fuel gas is generated when the fuel (gasoline) is evaporated in the fuel tank 51.

The evaporated fuel processing device 60 has the canister 61, a fuel vapor leakage checking module 62, purge lines 63, 64, 65, the purge valve 66, a pressure sensor 67, an ejector 68, and the like.

The canister 61 is a charcoal canister that accommodates activated charcoal capable of adsorbing the evaporated fuel gas an a case.

The evaporated fuel gas is introduced from the fuel tank 50 into the canister 61 via a pipe 61a.

A fuel cut valve 61b that prevents an inflow of liquid phase fuel is provided at an end nearer the fuel tank 50 of the pipe 61a.

The fuel vapor leakage checking module (ELCM) 62 is provided next to the canister 61 and automatically detects leakage of the evaporated fuel gas from the evaporated fuel processing device 60.

Each of the purge lines 63, 64, 65 is a pipe line through which the evaporated fuel gas stored in the canister 61 is introduced as the purge gas into the intake duct 21 of the intake system 20 during driving of the engine 1.

An end in the upstream of the purge line 63 is coupled to the canister 61, and an end in the downstream hereof is coupled to an entry side of the purge valve 66.

An end in the upstream of the purge line 64 is coupled to an exit side of the purge valve 66, and an end in the downstream thereof is coupled to the intake manifold 27.

A check valve 64a is provided in an intermediate part of the purge line 64.

The check valve 64a is a check valve that prevents a reverse flow of the purge gas from the intake manifold 27 to the purge valve 66.

The purge line 65 is used to introduce some of the purge gas that has flowed out of the purge valve 66 to the purge line 64 into the elector 68.

The purge line 65 is branched from a region of the purge line 64 between the purge valve 66 and the check valve 64a, and a downstream end thereof is coupled to a region of the ejector 68 that is on a downstream of a nozzle 68b.

A check valve 65a is provided in an intermediate part of the purge line 65.

The check valve 65a is a check valve that prevents the reverse flow of the purge gas from the intake manifold 27 to the purge valve 66.

The purge valve 66 is an electromagnetic valve that can be switched between an opened state where the purge gas can flow from the purge line 63 to the purge lines 64, 65 and a closed state where the purge line 63 and the purge line 64 are blocked from each other.

The purge valve 66 is opened/closed in accordance with an opening command or a closing command from the ECU 100.

The pressure sensor 67 is provided in the middle of the purge line 63 and detects pressure of the purge gas in the purge line 63.

Output of the pressure sensor 67 is transmitted to the ECU 100.

The ejector 68 is a negative pressure generator that suctions the purge gas by using the differential pressure between the upstream and the downstream of the compressor 41 of the turbocharger 40 and introduces the purge gas into the intake duct 21.

The elector 68 is formed in a shape of a cylindrical container and has an introduction pipe line 68a, the nozzle 68b, a discharge port 68c, and the like.

The introduction pipe line 68a is a pipe line that introduces air into an end in the upstream of the ejector 68, and the air is extracted from a region on the downstream of the compressor 41 in the intake duct 21.

The nozzle 68b constricts a flow of the air that is introduced from the introduction pipe line 68a and flows within the ejector 68 to increase a flow speed thereof, and thereby generates negative pressure by the Venturi effect.

A downstream end of the purge line 65 is coupled to a region on a downstream of the nozzle 68b in the ejector 68. The purge gas is suctioned into the ejector 68 by the negative pressure generated by the nozzle 68b and is merged into the flow of the air.

The discharge port 68c is a communicating part that is provided at an end in the downstream of the elector 68 and introduces the air and the purge gas, which have been merged, from inside of the ejector 68 into a region on the upstream of the compressor 41 in the intake duct 21.

The engine control unit (ECU) 100 is an engine control device that comprehensively controls the engine 1 and the auxiliaries thereof.

The ECU 100 has an information processing unit such as a CPU, storage units such as a RAM and a ROM, an input/output interface, a bus that couples these components, and the like, The ECU 100 receives the output of each of the sensors provided in the engine 1 and can output control signals to control targets that include the actuators, the valves, the ignition plug, the injector, and the like provided in the engine 1.

The ECU 100 computes driver requested torque on the basis of an operation amount (a depression amount) of an unillustrated accelerator pedal, controls the opening degree of the throttle 26, the valve timing, supercharging pressure, ignition timing, the fuel injection amount, injection timing, and the like such that actually generated torque by the engine 1 (actual torque) approximates the driver requested torque, and thereby adjusts the output (the torque) of the engine 1.

The ECU 100 also functions as a purge valve controller that transmits the opening command or the closing command to the purge valve 66 and as a purge valve stuck open diagnosis unit that detects the stuck open malfunction of the purge valve 66.

The stuck open malfunction of the purge valve 66 can appropriately be detected by using any of various types of techniques.

For instance, the pressure sensor 67 detects a pressure wave (intake pulsation) that is delivered from the intake manifold 27 through the purge lines 61, 63 regardless of a fact that the closing command is transmitted to the purge valve 66. In such a case, the ECU 100 may establish a stuck open malfunction determination.

Alternatively, the ECU 100 may establish the stuck open malfunction determination on the basis of a change in the air-fuel ratio that is detected by the front A/F sensor 33a or the like at a time when the opening command and the closing command are sequentially applied to the purge valve 66.

FIG. 2 is a flowchart that illustrates air-bypass valve control during the malfunction of the purge valve in the engine of the first example.

A description will hereinafter be made on steps of the process in sequence.

<Step S01: Canister Purge Valve Stuck Open Diagnosis>

The ECU 100 diagnoses presence or absence of the stuck open malfunction of the purge valve 66.

Thereafter, the process proceeds to step S02.

<Step S02: Stuck Open Malfunction Determination>

If the stuck open malfunction is detected in step S01, the process proceeds to step S03.

On the other hand, if the stuck open malfunction is not detected, a series of the process is terminated (returned).

<Step S03: Air-bypass Valve Opening Command>

The ECU 100 executes purge suppression control to apply the opening command to the air-bypass valve 24 so as to open the air-bypass valve 24 at a predetermined stuck open malfunction opening degree.

The stuck open malfunction opening degree is set in consideration of reducing the differential pressure between the upstream and the downstream of the compressor 41 to be lower than that during normal driving, suppressing generation of the negative pressure in the ejector 68, and making the pressure on the downstream of the compressor 41 in the intake duct 21 become at least equal to the purge gas pressure in the purge line 64.

In addition, the stuck open malfunction opening degree is set such that the air-fuel ratio (A/F) of the engine 1, which is detected by the front A/F sensor 33a or the like, is sufficiently leaner than a rich misfire limit.

The stuck open malfunction opening degree is set as an opening degree at which the above-described conditions are satisfied, for instance, full opening.

In the case where the air-bypass valve 24 is a valve whose opening degree can be controlled to any opening degree between full closing and full opening, the stuck open malfunction opening degree may be set in accordance with a driving state of the engine, so as to satisfy the above-described conditions. For instance, it may be configured that the stuck open malfunction opening degree can be read from a map that is prepared in advance in accordance with the driving state, such as an engine speed and the driver requested torque.

Thereafter, the series of the process is terminated (returned).

According to the first example that has been described so far, following effects can be obtained.

(1) When the stuck open malfunction of the purge valve 66 occurs, the air-bypass valve 24 is opened to circulate the air from the downstream to the upstream of the compressor 41. In this way, the differential pressure is reduced, and a suction force of the elector 68 is reduced. Thus, an inflow amount of the purge gas into the intake duct 21 can be suppressed.

(2) The opening degree of the air-bypass valve 24 during the purge suppression control is set such that the air-fuel ratio of the engine 1 is leaner than the rich misfire limit. In this way, rich misfire of the engine 1, which is caused by the stuck open malfunction of the purge valve 66, can be prevented in advance.

(3) The opening degree of the air-bypass valve 24 during the purge suppression control is set such the pressure in the intake manifold 27 becomes at least equal to the pressure in the purge line 64. In this way, an inflow amount of the purge gas from the purge line 64 into the intake manifold 27 is suppressed. Thus, the rich misfire can further reliably be prevented.

SECOND EXAMPLE

Next, a description will be made on a second example of the engine control device, to which the present invention is applied.

The substantially same parts as those in the above-described first example are denoted by the same reference signs, and the description thereon will not be made. The description will mainly be made on different points.

In the second example, when The stuck open malfunction of the purge valve 66 is detected, the ECU 100 executes feedback control on the opening degree of the air-bypass valve 24 such that the air-fuel ratio of the engine 1 detected by the front A/F sensor 33a deviates from (falls out of) a predetermined rich misfire occurring region.

According to the second example that has been described so far, the opening degree of the air-bypass valve 24 is subjected to the feedback control. Accordingly, in addition to the substantially same effects as those of the above-described first example, the rich misfire of the engine 1 can further reliably be prevented.

MODIFIED EXAMPLES

The present invention is not limited to the examples that have been described so far, and various modifications and changes can be made thereto. These modifications and changes also fall within the technical scope of the present invention.

(1) The configurations of the engine, the evaporated fuel processing device, the engine control device, and the like are not limited to those in the above-described examples and can appropriately be changed.

For instance, in the examples, the engine is the horizontally-opposed four-cylinder direct injection turbo gasoline engine. However, a cylinder layout, the number of the cylinders, a fuel injection mode, and the like are not particularly limited.

The present invention can also be applied to engines other than the gasoline engine.

(2) The opening degree of the air-bypass valve during the stuck open malfunction of the purge valve can also appropriately be changed. For instance, in the case where an emphasis is placed on impairment of the ejector function, the air-bypass valve may be fully opened, so as to suppress the differential pressure between the upstream and the downstream of the compressor.

In addition, in order to continuously introduce the purge gas to such a degree that drivability is secured and the rich misfire is prevened while generation of the supercharging pressure is allowed to some extent, the air-bypass valve may be controlled at a predetermined intermediate opening degree.

(3) A diagnosis method of the stuck open malfunction of the purge valve is not limited to what has been described in the examples but can appropriately be changed.

The invention claimed is:

1. An engine control device configured to control an engine, the engine control device comprising:
   a turbocharger that comprises: a turbine that is configured to he driven by exhaust gas of the engine; and a compressor that is coupled to the turbine and configured to compress fresh air;
   an air-bypass passage that communicates between an upstream and a downstream of the compressor;
   an air-bypass valve configured to open/close the air-bypass passage;
   a canister configured to store evaporated fuel gas generated in a fuel tank;
   an ejector configured to suction the evaporated fuel gas from the canister by using differential pressure between the upstream and the downstream of the compressor and to introduce the evaporated fuel gas to the upstream side of the compressor;
   a purge valve configured to open/close a purge passage through which the evaporated fuel gas is to be delivered from the canister to the ejector; and
   a purge valve diagnosis unit configured to detect stuck open malfunction of the purge valve, wherein when the purge valve diagnosis unit detects the stuck open malfunction, the engine control device executes purge suppression control so that an opening degree of the air-bypass valve becomes at least equal to a predetermined opening degree.

2. The engine control device according to claim 1, wherein
the opening degree of the air-bypass valve during the execution of the purge suppression control is set such that an air-fuel ratio of the engine is leaner than a rich misfire occurring region.

3. The engine control device according to claim 1, wherein
the opening degree of the air-bypass valve is subjected to feedback control during execution of the purge suppression control such that an air-fuel ratio of the engine is out of a rich misfire occurring region.

4. The engine control device according to claim 1, wherein
the purge passage includes a branched pipe section for introducing some of the evaporated fuel gas into an intake pipe line on the downstream of the compressor, and
an opening degree of the air-bypass valve is set such that pressure in the intake pipe line on the downstream of the compressor becomes equal to or higher than pressure in the purge passage during execution of the purge suppression control.

5. The engine control device according to claim 2, wherein
the purge passage includes a branched pipe section for introducing some of the evaporated fuel gas into an intake pipe line on the downstream of the compressor, and
an opening degree of the air-bypass valve is set such that pressure in the intake pipe line on the downstream of the compressor becomes equal to or higher than pressure in the purge passage during execution of the purge suppression control.

6. The engine control device according to claim 3, wherein
the purge passage includes a branched pipe section for introducing some of the evaporated fuel gas into an intake pipe line on the downstream of the compressor, and
an opening degree of the air-bypass valve is set such that pressure in the intake pipe line on the downstream of the compressor becomes equal to or higher than pressure in the purge passage during the execution of the purge suppression control.

\* \* \* \* \*